US006315465B1

(12) United States Patent
Mizue et al.

(10) Patent No.: US 6,315,465 B1
(45) Date of Patent: Nov. 13, 2001

(54) OPTICAL MODULE

(75) Inventors: Toshio Mizue; Yasuki Mikamura; Ichiro Tonai, all of Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/466,926

(22) Filed: Dec. 20, 1999

(30) Foreign Application Priority Data

Dec. 21, 1998 (JP) .................................................. 10-362684

(51) Int. Cl.[7] ........................................................ G02B 6/36
(52) U.S. Cl. .................................................................. 385/94
(58) Field of Search ........................................ 385/88–94

(56) References Cited

U.S. PATENT DOCUMENTS

| 5,099,307 | 3/1992 | Go et al. |
| 5,361,318 | 11/1994 | Go et al. |
| 5,416,871 | * 5/1995 | Takahashi et al. |
| 6,075,911 | * 6/2000 | Goto. |

FOREIGN PATENT DOCUMENTS 2-126107    10/1990    (JP) .

OTHER PUBLICATIONS

"Long Wavelength Transparent Epoxy Mold Optical Data Link", by Tonai et al., 1998 Electronic Components and Technology Conference, pp. 1199–1205.

* cited by examiner

*Primary Examiner*—Hung N. Ngo
(74) *Attorney, Agent, or Firm*—McDermott, Will & Emery (57) ABSTRACT

An electronic circuit is formed on a wiring substrate capable of cross wiring, and an electrode of the wiring substrate and a connecting portion of a lead frame are electrically connected to each other without wire bonding. As a consequence, while the substrate size is enhanced, the wiring pitch is reduced, whereby the electronic circuit can have a larger area and a larger scale. Further, the difference between the thickness of the encapsulating resin on the upper surface of the lead frame from the upper surface of the wiring substrate and the thickness of the encapsulating resin on the lower surface of the lead frame is made smaller than the thickness of the wiring substrate, whereby the occurring stress is reduced, and the encapsulating resin is kept from being distorted or cracking. Here realized is an optical module having a configuration in which, while the electronic circuit has a larger scale, the stability and durability are maintained.

7 Claims, 5 Drawing Sheets

OPTICAL MODULE

BACKGROUND OF THE INVENTION

1. Field of the Invention

The present invention relates to an optical module comprising an optical device which is a light-receiving device or light-emitting device.

2. Related Background Art

Optical modules such as receiving modules and transmitting modules are used in optical communication systems such as optical data links, optical LAN, and the like. A receiving module is equipped with a light-receiving device, for converting an optical signal transmitted through an optical fiber into an electric signal and outputting thus obtained electric signal; and a transmitting module is equipped with a light-emitting device, for converting an electric signal into an optical signal and sending out thus obtained optical signal to an optical fiber. Conventional examples of such optical modules are disclosed in Japanese Utility Model Application Laid-Open No. HEI 2-126107 and Japanese Patent Application Laid-Open No. HEI 2-278212.

An optical module comprises an optical device which is a light-receiving device or light-emitting device, and an electronic circuit connected to the optical device. In a conventional optical module, electronic components and wiring patterns constituting the electronic circuit are formed on a substrate or an island portion (substrate portion) of a lead frame functioning as a substrate, whereas the wiring pattern on the substrate and lead pins are connected to each other by wire bonding. Also, the electronic circuit and substrate, and individual components such as a metal package including an optical device are integrally molded with an insulating molding resin, so as to construct the optical module.

In the above-mentioned optical module, however, since the electronic circuit on the substrate and the lead frame are connected by wire bonding, it is necessary to provide the periphery of the substrate for wire bonding. Therefore, the size of the wiring substrate is restricted because of the necessity of the periphery region.

On the other hand, there has been known an optical module in which a lead frame is provided with an optical device mounting section and an electronic circuit mounting section which contain an optical device and an electronic circuit thereon respectively, and separately molded with a transparent resin (Proceedings of 48th Electronic Components & Technology Conference (1998), p. 1199). According to such a structure, the optical device and the electronic circuit are collectively mounted on the same lead frame.

In the structure mentioned above, the lead frame is formed by such a method as etching a sheet material or punching it with a pressing machine, whereby the wiring pattern of the electronic circuit is formed as well. Since the lead frame is formed from a single sheet material as such, however, cross wiring by which two or more wires are crossed cannot be made, whereby the degree of freedom in the electronic circuit configuration would be limited. For this matter, cross wiring may be realized by carrying out wire bonding in a part where crossing is necessary. In this case, however, impedance mismatching may occur, thus deteriorating circuit characteristics of the electronic circuit.

Also, in the case where a wiring pattern is formed by a lead frame, outer lead pins are formed simultaneously, whereby it is hard to form a wiring pattern with a wiring pitch not greater than the sheet thickness of the lead frame (on the order of 0.2 to 0.25 mm) due to conditions such as the strength of the lead frame and the easiness in its handling. Consequently, this technique cannot be utilized for forming complicated electronic circuits.

SUMMARY OF THE INVENTION

In view of the foregoing problems, it is an object of the present invention to provide an optical module having a configuration which can increase the flexibility of its electronic circuit.

For achieving such an object, the optical module in accordance with the present invention is an optical module comprising an optical device for converting one of an optical signal having a predetermined wavelength and an electric signal corresponding thereto into the other signal, an electronic circuit for processing the electric signal, and a lead frame having a lead pin connected to the electronic circuit; wherein a wiring substrate formed with at least a part of the electronic circuit is secured to one surface of the lead frame; wherein an electrode provided in the wiring substrate and a connecting portion provided in the lead frame are directly connected to each other, so that the electronic circuit on the wiring substrate and the lead frame are electrically connected to each other, the wiring substrate and the connecting portion of the lead frame being encapsulated with a resin so as to form an electronic circuit encapsulating portion; and wherein, in the electronic circuit encapsulating portion, a difference between a thickness of the encapsulating resin on the one surface of the lead frame from a surface of the wiring substrate opposite from the lead frame and a thickness of the encapsulating resin on the other surface of the lead frame is smaller than a thickness of the wiring substrate.

In this optical module, not only the electronic components and the wiring pattern on the lead frame but also the wiring substrate mounted on the lead frame is used for constructing the electronic circuit. As a consequence, the degree of freedom in the electronic circuit configuration can be enhanced such that cross wiring is formed within the substrate, for example. Also, the wiring pitch can be made sufficiently small, so as to meet increase in the complexity of electronic circuits.

Also, instead of using wire bonding for electric connection between the electronic circuit on the wiring substrate and the lead frame, the connecting portion is provided in the lead frame so as to face the electrode in the wiring substrate. The electrode and the connecting portion are secured and electrically connected to each other by use of an electrically conductive connecting member or the like. Here, it is unnecessary to provide the periphery of the wiring substrate for wire bonding, and no wiring pad for the lead frame is required, whereby the wiring substrate can be made larger, so as to increase the area of the electronic circuit.

In such a configuration, since the wiring substrate and the resin for encapsulating the wiring substrate so as to form the electronic circuit encapsulating portion have their respective coefficients of thermal expansion different from each other, the encapsulated resin may break after the encapsulation. In particular, in the case where the encapsulating resin of the electronic circuit encapsulating portion is a transparent resin, since the amount of fillers added to the transparent resin is small, a transparent epoxy resin, for example, has a thermal expansion coefficient on the order of 6.2 to 17.2 × $10^{-5}/°$ C., which is at least 2 times larger than that of normal epoxy resins. On the other hand, a ceramic substrate such as alumina ($Al_2O_3$), which is often used as a wiring substrate, has a thermal expansion coefficient of about $5.5\times10^{-6}/°$ C., for example, thus yielding a difference of 10 times or greater therebetween. Though the difference is slightly smaller as compared with the transparent epoxy resin, similar problems exist in the normal epoxy resins as well.

In particular, in the case where the wiring substrate is mounted on the lead frame, if the thickness of encapsulating resins on the upper and lower sides of the lead frame are same, then the encapsulating resin on the wiring substrate will become thinner than the thickness of the encapsulating resin on the other side by the thickness of the wiring substrate. Here, due to the structural asymmetry of the encapsulating resins, stresses generated in the respective resin portions would be out of balance, whereby distortions and cracks in the encapsulating resin may occur at the portions where excessive stresses concentrate.

For this matter, in the optical module in accordance with the present invention, the difference between the thickness of the encapsulating resin on the upper side of the lead frame excluding the wiring substrate and the thickness of the encapsulating resin on the lower side of the lead frame is set so as to become smaller than the thickness of the wiring substrate by modifying the form of the encapsulating portion, arranging the position of the wiring substrate within the encapsulating resin, adding other members, and the like. As a consequence, concentration of excessive stresses are alleviated, so that distortions and cracks of the encapsulating resin can be prevented, whereby a resin molded package with a high reliability can be realized. Also, it enables the resin molded package to become thinner. Hence realized is an optical module having a configuration in which, while the electronic circuit has a larger scale, the stability and reliability are maintained.

The above-mentioned thickness condition concerning the encapsulating resin on both of the upper and lower sides of the lead frame may not necessarily be applied to the whole electronic circuit encapsulating portion. For example, if the above-mentioned thickness condition is applied to the resins just above the substrate and just beneath the substrate, then the encapsulating resin can be prevented from being distorted and cracking.

The present invention will become more fully understood from the detailed description given hereinbelow and the accompanying drawings. They are given by way of illustration only, and thus should not be considered limitative of the present invention.

Further scope of applicability of the present invention will become apparent from the detailed description given hereinafter. However, it is clear that the detailed description and specific examples, while indicating preferred embodiments of the invention, are given by way of illustration only, and various changes and modifications within the spirit and scope of the invention will become apparent to those skilled in the art from this detailed description.

DESCRIPTION OF THE PREFERRED EMBODIMENTS

In the following, preferred embodiments of the present invention will be explained with reference to the accompanying drawings. For easier understanding of the explanation, constituents identical to each other will be referred to with reference numerals identical to each other whenever possible, without repeating their overlapping descriptions. In the drawings, shapes and dimensions of constituents are partly exaggerated for their explanations and do not always coincide with those in practice.

Here, for the convenience of explanation, the upward and downward directions in lead frames and wiring substrates will be defined. While a wiring substrate is mounted on one surface of a lead frame in each of the following optical modules, the directions toward this one surface and the other surface as seen from the lead frame are defined as upward and downward directions, respectively. As for the lead frame, in conformity to this definition, the surface of the side mounted with the wiring substrate and the surface on the opposite side are defined as upper and lower faces, respectively. As for the wiring substrate, the surface mounted with electronic components on the opposite side from the lead frame and the surface on the lead frame side are defined as upper and lower faces, respectively.

Figure 1:
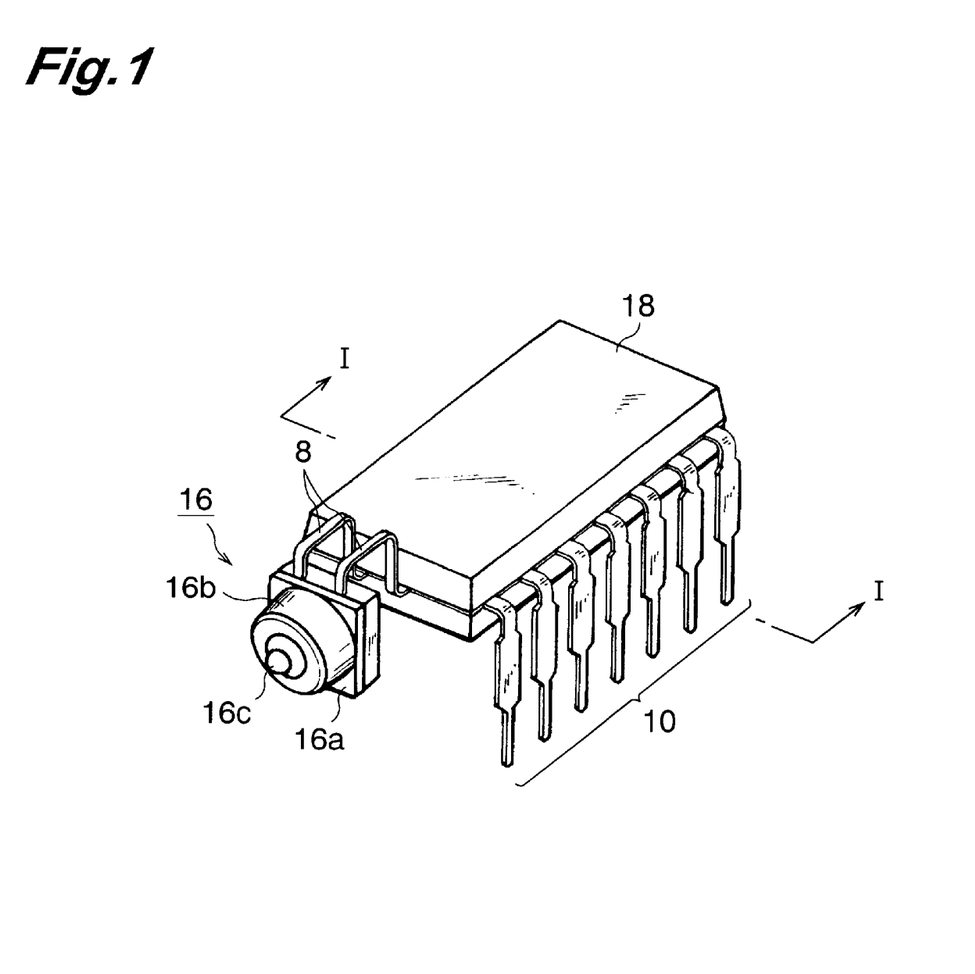
FIG. 1 is a perspective view showing the exterior configuration of a first embodiment of the optical module.

FIG. 1 is a perspective view showing the exterior configuration of a first embodiment of the optical module in accordance with the present invention. In the optical module in this embodiment, an optical device is resin-encapsulated in an optical device encapsulating portion 16, and an electronic circuit is resin-encapsulated in an electronic circuit encapsulating portion 18, independently from each other. The optical device encapsulating portion 16 and the electronic circuit encapsulating portion 18 are connected to each other by means of inner lead pins 8.

This optical module is of DIP (dual inline package) type, so that outer lead pins 10 project from both sides of the electronic circuit encapsulating portion 18.

Figure 2:
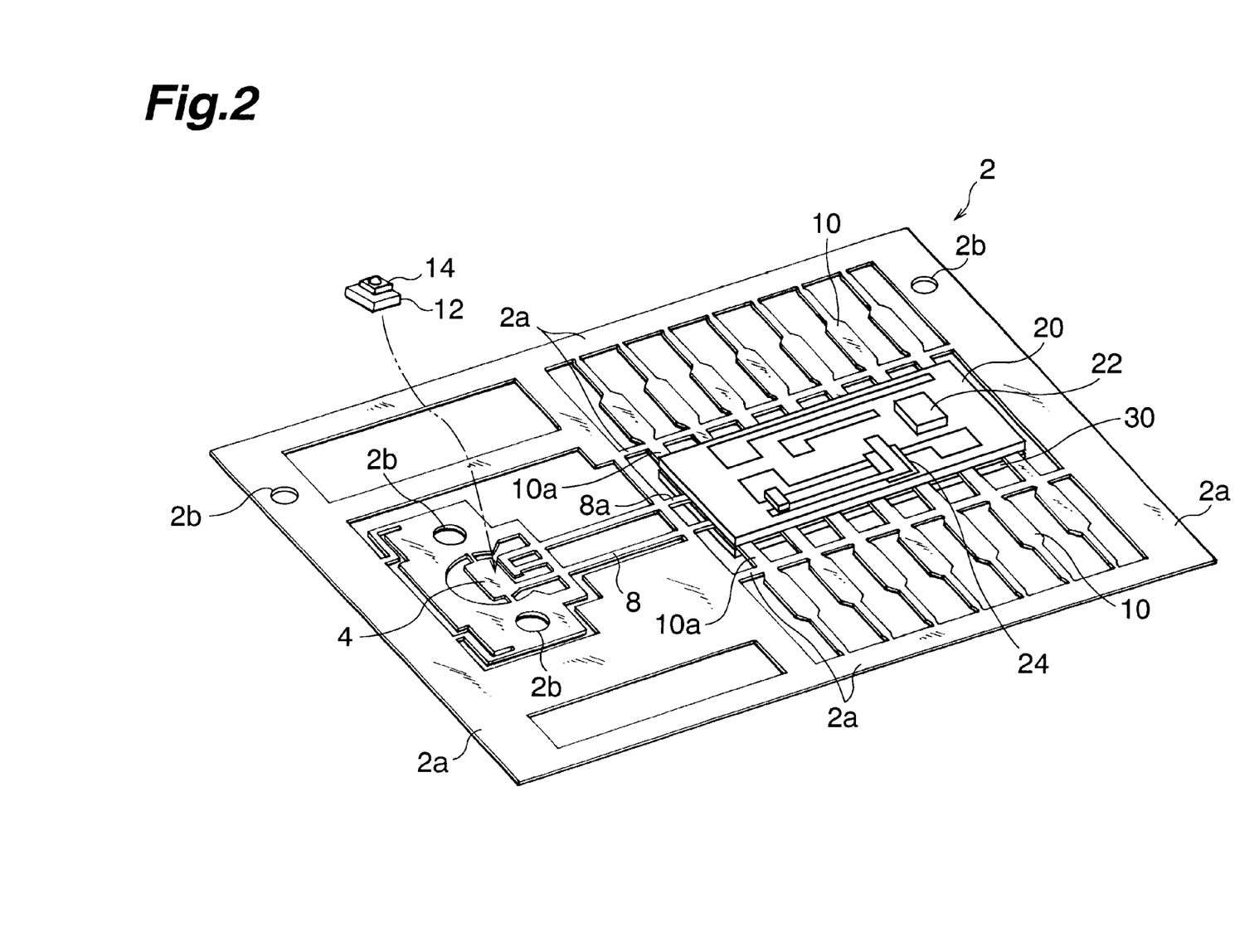
FIG. 2 is a perspective view showing the configuration of the lead frame and wiring substrate employed in the optical module shown in FIG. 1.
Figure 3:
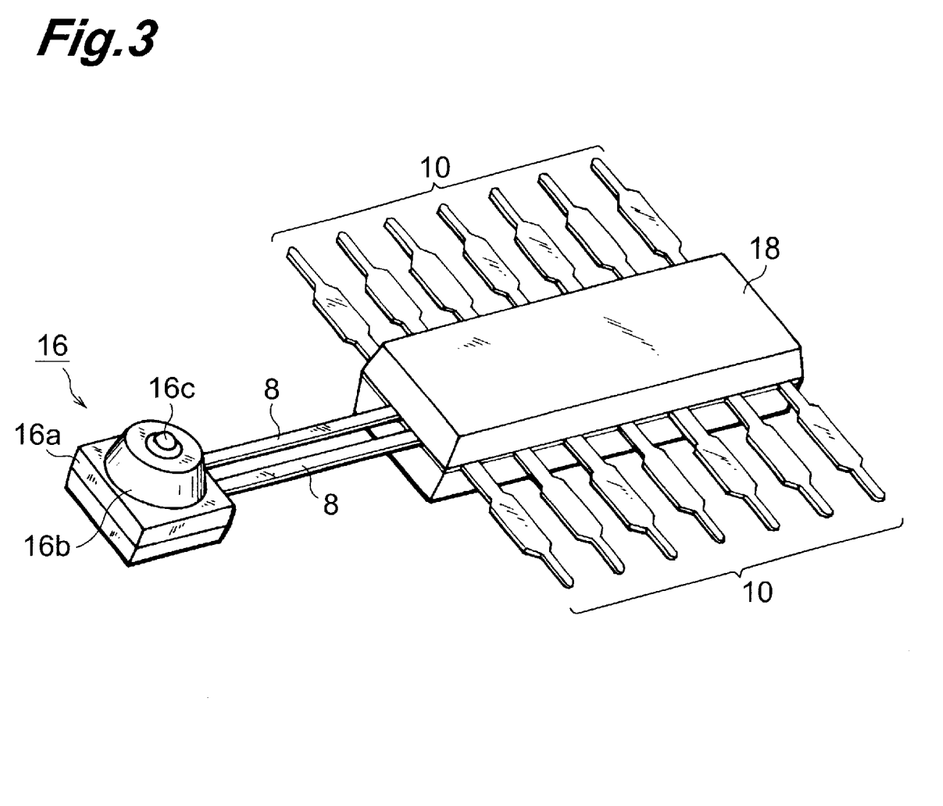
FIG. 3 is a perspective view showing the configuration of an intermediate component of the optical module shown in FIG. 1.

With reference to FIGS. 2 and 3, the structure of the optical module in accordance with the embodiment shown in FIG. 1 and the process of making the same will now be explained.

In this optical module, a metal lead frame 2 having the structure shown in FIG. 2 is used. The lead frame 2 is formed with an optical device mounting section 4 for mounting an optical device 14, 2 inner lead pins 8 for connecting the optical device mounting section 4 and the electronic circuit to each other, and 14 outer lead pins 10 in total disposed 7 by 7 on both sides of a wiring substrate which will be explained later. Respective parts of the inner lead pins 8 and outer lead pins 10 on the wiring substrate side are provided with connecting portions 8a and 10a.

The lead frame 2 is integrally formed as a whole by etching a thin sheet made of a metal (e.g., copper) having a thickness of about 0.25 mm or punching it with a pressing machine, for example. Individual parts such as the above-mentioned optical device mounting section 4 are formed as being integrally supported by a frame portion 2a of the lead frame 2. Also, at predetermined positions, the lead frame 2 is formed with a plurality of engagement holes 2b for positioning a resin molding die which will be explained later.

Via a sub-mount member 12, the optical device 14 in the form of a semiconductor chip (bare chip) is secured onto the optical device mounting section 4. As for the sub-mount member 12 and the optical device 14, in the case where the optical module is a receiving module, a parallel electrode type capacitor (Die Capacitance) or the like is employed as the sub-mount member 12, whereas a light-receiving device such as InGaAs-PIN type photodiode sensitive to an optical signal in the 1.3-μm wavelength band or the like is employed as the optical device 14. In the case where the optical module is a transmitting module, on the other hand, the sub-mount member 12 is a member for dissipating heat and is formed from diamond or an aluminum nitride material, whereas a light-emitting device such as a surface-emitting InGaAsP light-emitting diode adapted to emit an optical signal in the 1.3-μm wavelength band or a surface-emitting InGaAs laser diode is employed as the optical device 14.

A wiring substrate 20 is mounted on the upper face side of the connecting portions 8a and 10a. On the wiring substrate 20, electronic components such as an IC 22 are mounted, and a wiring pattern (schematically shown in FIG. 2) is formed, so as to constitute an electronic circuit for processing electric signals. In the lower part of the wiring substrate 20, electrodes 20a (see the sectional view shown in FIG. 4) are disposed at their respective positions corresponding to the connecting portions 8a and 10a. The connecting portions 8a and 10a and the electrodes 20a are electrically connected to each other by means of an electrically conductive connecting material.

Secured to the lower face side of the connecting portions 8a and 10a is a substrate-shaped auxiliary member 30 which is made of a material identical to that of the wiring substrate 20 and has a form substantially identical thereto. For securing the auxiliary member 30, it is not necessary to use an electrically conductive connecting material, and a normal adhesive having no electric conductivity may be used therefor.

After the optical device 14, the wiring substrate 20 formed with the electronic circuit, and the lead pins 8, 10 are connected to each other to form individual parts of the optical module as mentioned above, a resin molding die having a predetermined form is positioned and attached to the lead frame 2 by means of the engagement holes 2b. Then, a resin transparent to an optical signal having a predetermined wavelength (e.g., 1.3 μm) is injected into this die, and the optical device 14 and the electronic circuit are resin-encapsulated separately from each other by a transfer-molding process (see FIG. 3). As a consequence, the optical device encapsulating portion 16 for integrally encapsulating the optical device mounting section 4 and the sub-mount member 12 and optical device 14 mounted therewith, and the electronic circuit encapsulating portion 18 for integrally encapsulating the connecting portions 8a and 10a and the wiring substrate 20 and auxiliary member 30 mounted therewith are molded. Here, the optical device encapsulating portion 16 for encapsulating the optical device 14 may be molded with a transparent resin, whereas the electronic circuit encapsulating portion 18 may be molded with a nontransparent resin.

The optical device encapsulating portion 16 has a base 16a, having a substantially rectangular parallelepiped form, for encapsulating the optical device mounting section 4, the sub-mount member 12, and the optical device 14; a pedestal 16b integrally molded on the base 16a and shaped like a circular truncated cone; and an aspherical lens 16c integrally molded at the apex part of the pedestal 16b. The optical axis of the aspherical lens 16c and that of the optical main surface (light-receiving surface or light-emitting surface) of the optical device 14 coincide with each other.

The pedestal 16b is formed as a circular truncated cone, concentric with the optical axis of the aspherical lens 16c and optical device 14, having a side face with a predetermined angle of inclination and a predetermined height so as to taper down toward the apex part thereof.

After the optical device encapsulating portion 16 and the electronic circuit encapsulating portion 18 are molded, unnecessary parts of the lead frame 2 are cut off, so as to form an intermediate component shown in FIG. 3. Further, predetermined bending processes are carried out so as to bend the inner lead pins 8 into a hook shape so that the light-collecting aspherical lens 16c faces the opposite side from the electronic circuit encapsulating portion 18, and bend the outer lead pins 10, whereby an optical module of a DIP (dual inline package) type shown in FIG. 1 is obtained.

In the optical module in accordance with this embodiment, the wiring pattern of the electronic circuit is not formed by the lead frame and wire bonding alone, but the wiring substrate 20 is mounted on the connecting portions 8a and 10a of the lead frame 2. When a wiring pattern is formed on this wiring substrate 20, cross connection schematically indicated by numeral 24 in FIG. 2, for example, can easily be realized. Such cross wiring is free from the problem of impedance mismatch occurred in the cross wiring formed by bonding wire connection between wiring patterns provided by a lead frame, whereby favorable circuit characteristics can be obtained. Also, since the wiring pitch can be made smaller than that in the wiring pattern provided by the lead frame, the wiring can be made more efficiently, so as to meet increases in the complexity of electronic circuits.

Figure 4:
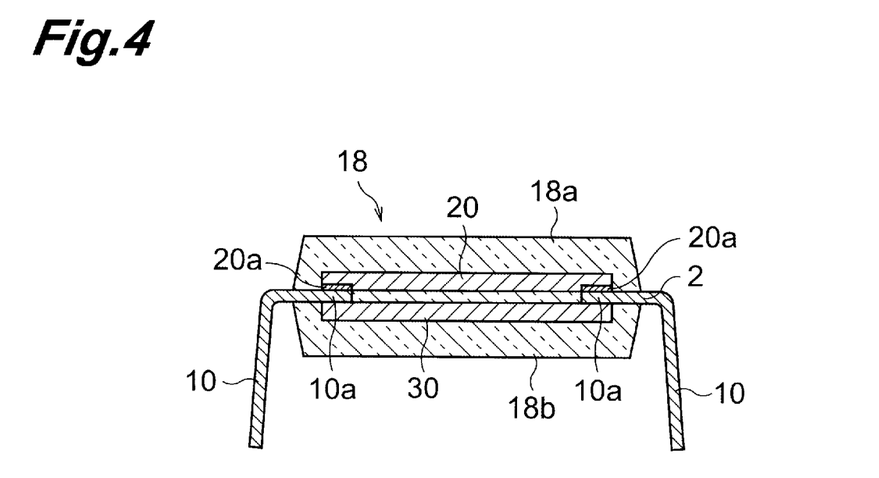
FIG. 4 is a sectional view of the optical module shown in FIG. 1 taken along the line I—I.

Also, the electrodes 20a are disposed on the lower face side of the wiring substrate 20 at parts respectively facing the connecting portions 8a and 10a of the lead frame 2. The connecting portions 8a and 10a and the electrodes 20a are secured as shown in FIG. 4 by die bonding by way of an electrically conductive connecting material, so as to electrically connect the electronic circuit on the wiring substrate 20 and the lead frame 2 to each other.

Since the connecting portions 8a and 10a are connected to their corresponding inner lead pins 8 and outer lead pins 10, necessary connection can be realized thereby without wire bonding. Here, it becomes unnecessary to provide a region for arranging wires between the wiring substrate 20 and the lead pins 8, 10, and wiring pads on the wiring substrate 20 and lead frame 2. Consequently, the size of the wiring substrate 20 can be made larger, so as to enhance the area of the electronic circuit.

As the above-mentioned electrically conductive connecting material, an electrically conductive resin can be used. Examples of the electrically conductive resin include resins containing an electrically conductive filler made of Ag (silver) and the like. Alternatively, solder such as Sn (tin)/Pb (lead) alloy can be used. The supporting of the wiring substrate 20 by the lead frame 2 may be realized by the above-mentioned securing onto the connecting portions 8a and 10a alone, or by forming the lead frame 2 with a support portion for the wiring substrate 20.

Here, the coefficient of thermal expansion of the wiring substrate 20 and that of the encapsulating resin constituting the electronic circuit encapsulating portion 18 are greatly different from each other. In particular, in the case where the encapsulating resin of the electronic circuit encapsulating portion 18 is a transparent resin, since the amount of fillers added to the transparent resin is small, a thermal expansion coefficient of a transparent epoxy resin is in the order of 6.2 to $17.2 \times 10^{-5}/°$ C., which is at least 2 times that of normal epoxy resins. On the other hand, a ceramic substrate such as alumina ($Al_2O_3$), which is often used as the wiring substrate 20, has a thermal expansion coefficient of about $5.5 \times 10^{-6}/°$ C., for example, thus yielding a difference of 10 times or greater therebetween. Though the difference is slightly smaller as compared with the transparent epoxy resin, similar problems exist in the normal epoxy resins as well.

Resin encapsulation is carried out by a transfer molding process using a thermosetting resin, in which the resin injected into a die is cured as being heated and held at a temperature of the molding for a predetermined time, so as to form the encapsulating portions. While the heating temperature at this time is set to about 140 to 160° C. in the case of a transparent resin, for example, a large stress is generated in the encapsulating resin due to the above-mentioned difference in thermal expansion coefficient between the wiring substrate 20 and the encapsulating resin of the electronic circuit encapsulating portion 18 when the encapsulating resin returns to normal temperature after the molding process, whereby distortions and cracks may occur in the electronic circuit encapsulating portion 18. In particular, when the structure within the encapsulating portion 18 is asymmetrical due to the mounting of the wiring substrate 20 on one surface of the lead frame 2, the stresses increase, and excessive stresses concentrate in the encapsulating portion 18.

For overcoming such problems, in the optical module in accordance with the present invention, the electronic circuit encapsulating portion is formed such that the difference between the thickness of the encapsulating resin on the upper surface of the lead frame (hereinafter referred to as upper encapsulating resin) from the upper surface of the wiring substrate to the outer surface of the resin, and the thickness of the encapsulating resin on the lower surface of the lead frame (hereinafter referred to as lower encapsulating resin) is smaller than the thickness of the wiring substrate. As a consequence, the respective stresses occurring on the upper and lower sides of the lead frame and wiring substrate can be made generally equal to each other, so as to avoid the occurrence of excessive stresses and stress concentrations, whereby the encapsulating resin can be prevented from being distorted or cracking.

In the above-mentioned embodiment, with respect to the wiring substrate 20 mounted on the upper side of the lead frame 2, the auxiliary member 30 made of the same material as that of the wiring substrate 20 and shaped substantially identical thereto is disposed on the lower side of the lead frame 2. Consequently, as shown in FIG. 4 as the sectional view of the optical module taken along the line I—I of FIG. 1, the wiring substrate 20 and the upper encapsulating resin 18a are disposed on the upper side of the lead frame 2, and the auxiliary member 30 and the lower encapsulating resin 18b are disposed on the lower side thereof within the electronic circuit encapsulating portion 18 in a substantially vertically symmetrical configuration.

Here, the thickness of the lower encapsulating resin 18b is, as with the upper encapsulating resin 18a, the thickness from the lower surface of the auxiliary member 30 to the outer surface of the resin, whereby the upper and lower encapsulating resins 18a and 18b have substantially the same thickness. Therefore, stresses are substantially equally distributed over the encapsulating resins 18a, 18b, whereby distortions and cracks of the electronic circuit encapsulating portion 18 due to stress concentrations can be prevented. The foregoing configuration realizes an optical module having a larger scale of the electronic circuit and maintaining the stability and durability as a product.

When stresses occurring in such a configuration were calculated while assuming the thickness of the lead frame 2 to be 0.25 mm, the thickness of each of the wiring substrate 20 and the auxiliary member 30 to be 0.38 mm, and the thickness of each of the upper encapsulating resin 18a and lower encapsulating resin 18b from the surface of the lead frame 2 to the outer surface of the resin to be 1 mm, it was proved that the stress was greatly reduced by about 26%. The bending stress applied to the substrate itself is similarly reduced as well.

An example of the material of the wiring substrate 20 and auxiliary member 30 is a ceramic material such as alumina. In this case, the wiring pattern can be formed by a normal thick film printing technique. Alternatively, a resin material such as glass epoxy may be used. In this case, the coefficient of thermal expansion of the substrate can be set to a value close to that of the encapsulating resin, so as to reduce the stress. The material of the auxiliary member 30 is not necessarily be the same as that of the wiring substrate 20, and other materials may be employed as long as they have a coefficient of thermal expansion and Young's modulus similar to those of the wiring substrate 20.

As the encapsulating resin used in the electronic circuit encapsulating portion 18, a nontransparent resin may be employed separately from the optical device encapsulating portion 16. In the case of the nontransparent resin, the amount of addition of the filler such as silica is greater than that in the transparent resin, so that its thermal expansion coefficient is closer to that of the wiring substrate 20 such as a ceramic substrate, whereby the stress can further be suppressed.

Since electronic components such as the IC 22 are mounted on the upper surface of the wiring substrate 20, the thickness of the upper encapsulating resin 18a may be set slightly greater than that of the lower encapsulating resin 18b in view of the effect thereof.

Further, in this embodiment, the lead frame 2 is provided with the optical device mounting section 4 for mounting the optical device 14. As a consequence, the number of components of the optical module can be reduced, so as to lower the cost of manufacture. Also, since the optical device mounting section 4 and the connecting portions 8a and 10a functioning as the electronic circuit mounting section are formed separately from each other, the degree of freedom in electronic circuit design increases, thereby making it possible to mount a complicated, large-scale electronic circuit which can meet the demands for advanced optical communications.

Also, the optical device encapsulating portion 16 and the electronic circuit encapsulating portion 18 are molded separately and independently from each other, while yielding a structure in which they are electrically and mechanically connected to each other by the inner lead pins 8. As a consequence, when employed in communication instruments such as optical transceivers, the position where the optical device encapsulating portion 16 is attached can be adjusted independently without being influenced by the enlargement of the electronic circuit encapsulating portion 18 due to the increase in the size of its electronic circuit or by the position where the electronic circuit encapsulating portion 18 is attached. Therefore, the alignment of the optical fibers in the communication instruments can easily be carried out.

Also, since the light-collecting aspherical lens 16c is integrally molded with the optical device encapsulating portion 16, the number of components is reduced, and it becomes unnecessary to adjust the optical axes of the optical device 14 and the aspherical lens 16c. Further, since it is unnecessary to employ such a structure in which the light-collecting lens and the optical device are connected to each other by means of a connector made of a metal or the like, a lower cost can be realized.

Also, since this optical module has no movable parts, it yields an excellent structure in which the mechanical strength is high, the optical precision is always kept in an optimal state, and so forth.

As for the configuration of the electronic circuit, though this embodiment has a configuration in which all the electronic components and wiring patterns are formed on the wiring substrate 20, a wiring pattern formed by the lead frame 2 may be used in a part thereof not including cross wiring. When the wiring pattern of the lead frame 2 is provided with a connecting portion, and an electrode is disposed in the wiring substrate 20 so as to correspond to the connecting portion, electric connection can be established without wire bonding in this case as well. Here, the electronic components may be mounted on one of the wiring pattern on the wiring substrate 20 and the wiring pattern formed by the lead frame 2, or mounted on each of the wiring substrate 20 and lead frame 2. Also, a plurality of substrates can be used.

Without being restricted to the above-mentioned embodiment, the optical module in accordance with the present invention can be modified in various manners.

Figure 5:
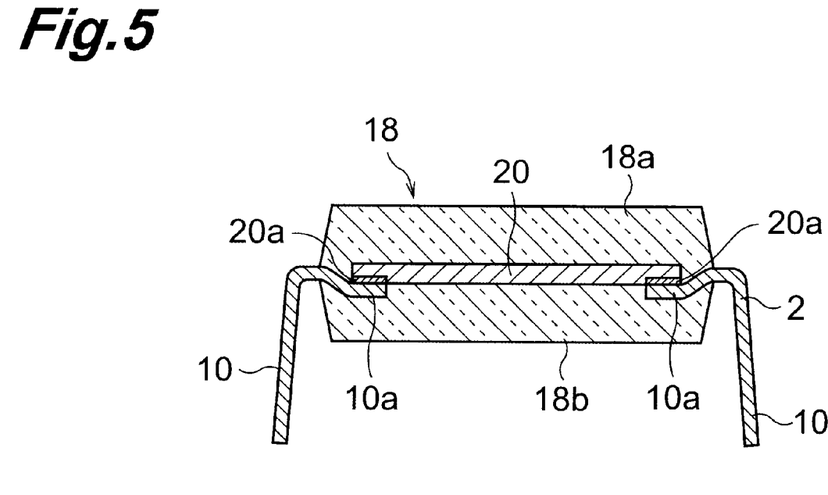
FIG. 5 is a sectional view showing a second embodiment of the optical module.

FIG. 5 is a sectional view showing a second embodiment of the optical module. This drawing corresponds to the sectional view, shown in FIG. 4, of the first embodiment taken along the line I—I. In the second embodiment, no auxiliary member 30 is used for reducing the difference in thickness of the encapsulating resin, but the connecting portions 8a and 10a are formed so as to be offset to the lower side as viewed from the lead frame 2, whereby the difference in thickness between the upper and lower encapsulating resins 18a, 18b is reduced.

Specifically, the connecting portions 8a and 10a, which are the respective end portions of the lead pins 8 and 10 on the wiring substrate 20 side, are bent so as to fall down from the lead frame 2. Here, since the position of the wiring substrate 20, shifted upward within the electronic circuit encapsulating portion 18 as shown in FIG. 4, is adjusted toward the center side, the difference in thickness between the upper and lower encapsulating resins 18a, 18b is lowered, whereby the stress is suppressed.

When stresses were calculated in the optical module having the structure shown in FIG. 5 under conditions such as thickness and the like similar to those of the one shown in FIG. 4, the ratio of reduction in stress was similarly high, i.e., about 29%.

Figure 6:
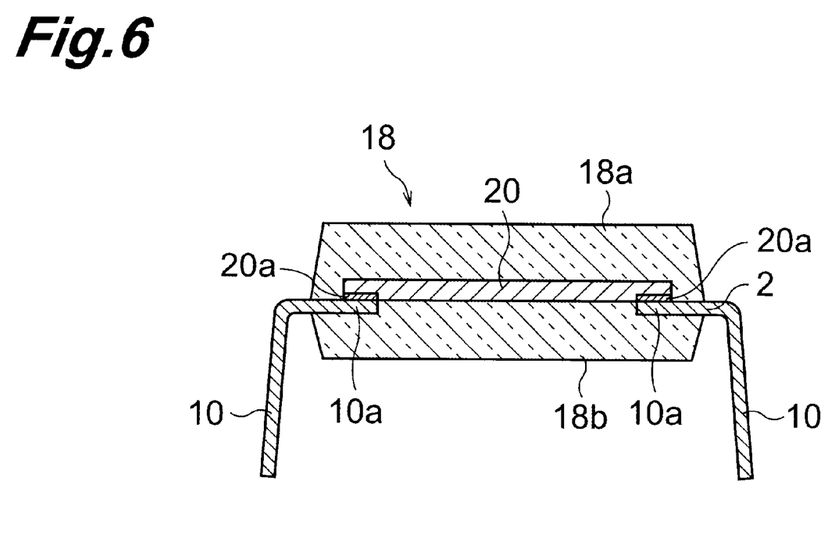
FIG. 6 is a sectional view showing a third embodiment of the optical module.

FIG. 6 is a sectional view showing a third embodiment of the optical module. In this embodiment, while the wiring substrate 20 is mounted as it is on the lead frame 2 on the upper side of the connecting portions 8a and 10a, the thickness of the upper encapsulating resin 18a (including the thickness of the wiring substrate 20) from the upper surface of the lead frame 2 to the outer surface of the resin is made greater than the thickness of the lower encapsulating resin 18b from the lower surface of the lead frame 2 to the outer surface of the resin. As a consequence, the difference of encapsulating resin thickness between the upper and lower encapsulating resins 18a, 18b is compensated, whereby the stress is suppressed.

The thickness condition concerning the upper encapsulating resin 18a and lower encapsulating resin 18b for reducing the difference in thickness therebetween may not necessarily be applied to the whole encapsulating resin forming the electronic circuit encapsulating portion 18. For example, as shown in the following modified examples (FIGS. 7 and 8), a configuration in which the above-mentioned thickness condition is applied to, of the encapsulating resin of the electronic circuit encapsulating portion 18, the part facing the wiring substrate 20 and including a portion generating a structural asymmetry within the encapsulating portion 18 can also suppress the occurrence of stress.

Figure 7:
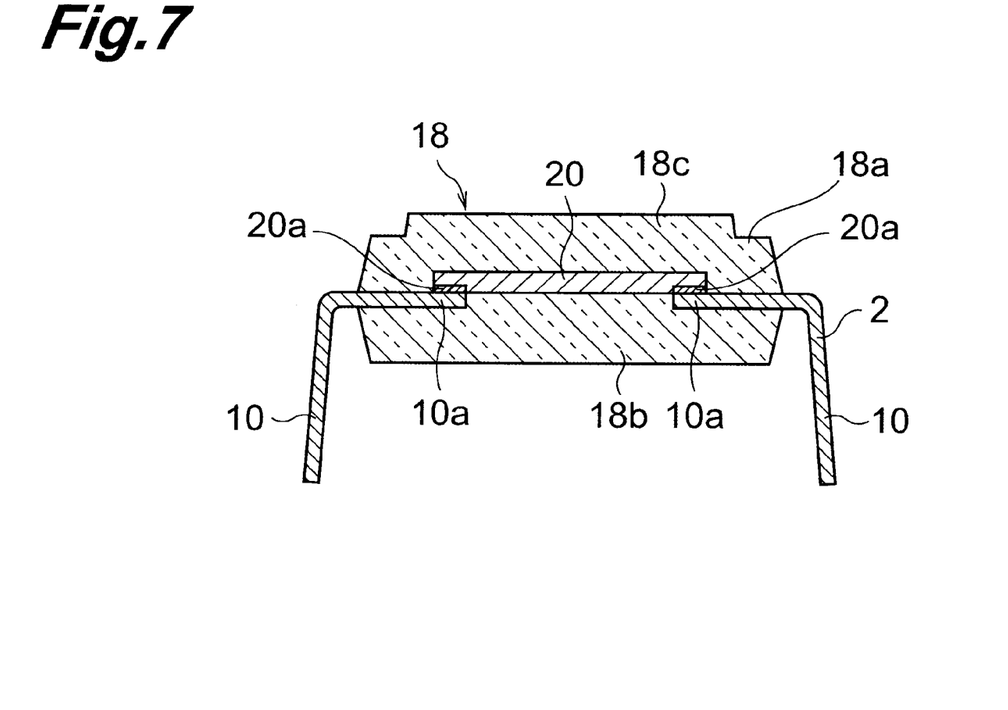
FIG. 7 is a sectional view showing a fourth embodiment of the optical module.

FIG. 7 is a sectional view showing a fourth embodiment which is a modified example of the third embodiment shown in FIG. 6. In this embodiment, instead of increasing the thickness of the whole upper encapsulating resin 18a as shown in FIG. 6, a protrusion 18c with an increased thickness is formed in a part of the upper encapsulating resin 18a including the upper part of the wiring substrate 20.

Figure 8:
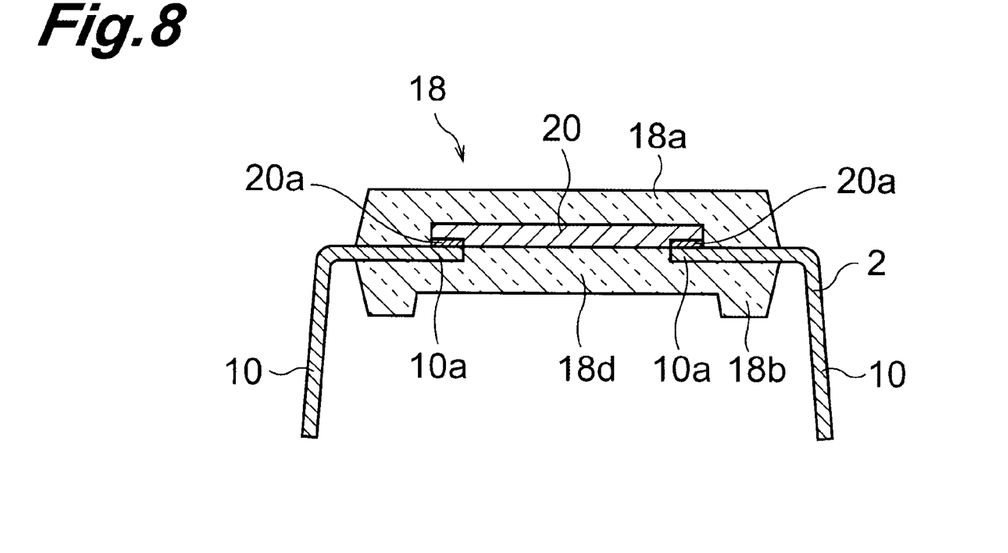
FIG. 8 is a sectional view showing a fifth embodiment of the optical module.

FIG. 8 is a sectional view showing a fifth embodiment which is a modified example of the third embodiment shown in FIG. 6. In this embodiment, a depression 18d with a decreased thickness is formed in a part of the lower encapsulating resin 18b including the lower part of the wiring substrate 20. In the fourth and fifth embodiments, as in the third embodiment, the difference in thickness between the upper and lower encapsulating resins 18a, 18b is reduced, whereby the stress is suppressed.

Not only the above-mentioned first to fifth embodiments, but also various configurations can reduce the difference in thickness between the upper and lower encapsulating resins. Also, though each of the above-mentioned embodiments relates to a DIP type optical module, the optical module in accordance with the present invention is similarly applicable to SIP (single inline package) type optical modules as well.

From the foregoing explanations of the invention, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical module comprising an optical device for converting one of an optical signal having a predetermined wavelength and an electric signal corresponding thereto into the other signal, an electronic circuit for processing said electric signal, and a lead frame having a lead pin connected to said electronic circuit;

wherein a wiring substrate formed with at least a part of said electronic circuit is secured to one surface of said lead frame;

wherein an electrode provided in said wiring substrate and a connecting portion provided in said lead frame are directly connected to each other, so that said electronic circuit on said wiring substrate and said lead frame are electrically connected to each other, said wiring substrate and said connecting portion of said lead frame being encapsulated with a resin so as to form an electronic circuit encapsulating portion; and wherein, in said electronic circuit encapsulating portion, a difference between a thickness of the encapsulating resin on said one surface of said lead frame from a surface of said wiring substrate opposite from said lead frame and a thickness of the encapsulating resin on the other surface of said lead frame is smaller than a thickness of said wiring substrate.

2. An optical module according to claim 1, wherein said lead frame further comprises an optical device mounting section for mounting said optical device; and wherein said optical device and said optical device mounting section are encapsulated, separately from said electronic circuit encapsulating portion, with a transparent resin which transmits therethrough light having said predetermined wavelength, so as to form an optical device encapsulating portion.

3. An optical module according to claim 1, further comprising a substrate-shaped auxiliary member disposed on said other surface of said lead frame within said electronic circuit encapsulating portion.

4. An optical module according to claim 1, wherein said connecting portion is shaped into a form offset to said other surface side.

5. An optical module according to claim 1, wherein the thickness of the encapsulating resin on said one surface of said lead frame from said one surface of said lead frame is greater than the thickness of the encapsulating resin on said other surface of said lead frame from said other surface of said lead frame.

6. An optical module according to claim 1, wherein said electrode and said connecting portion are electrically connected to each other by an electrically conductive resin.

7. An optical module according to claim 1, wherein said electrode and said connecting portion are electrically connected to each other by solder.

* * * * *